(No Model.)
S. ROTHCHILD.
HARROW AND PULVERIZER.
No. 362,464. Patented May 3, 1887.
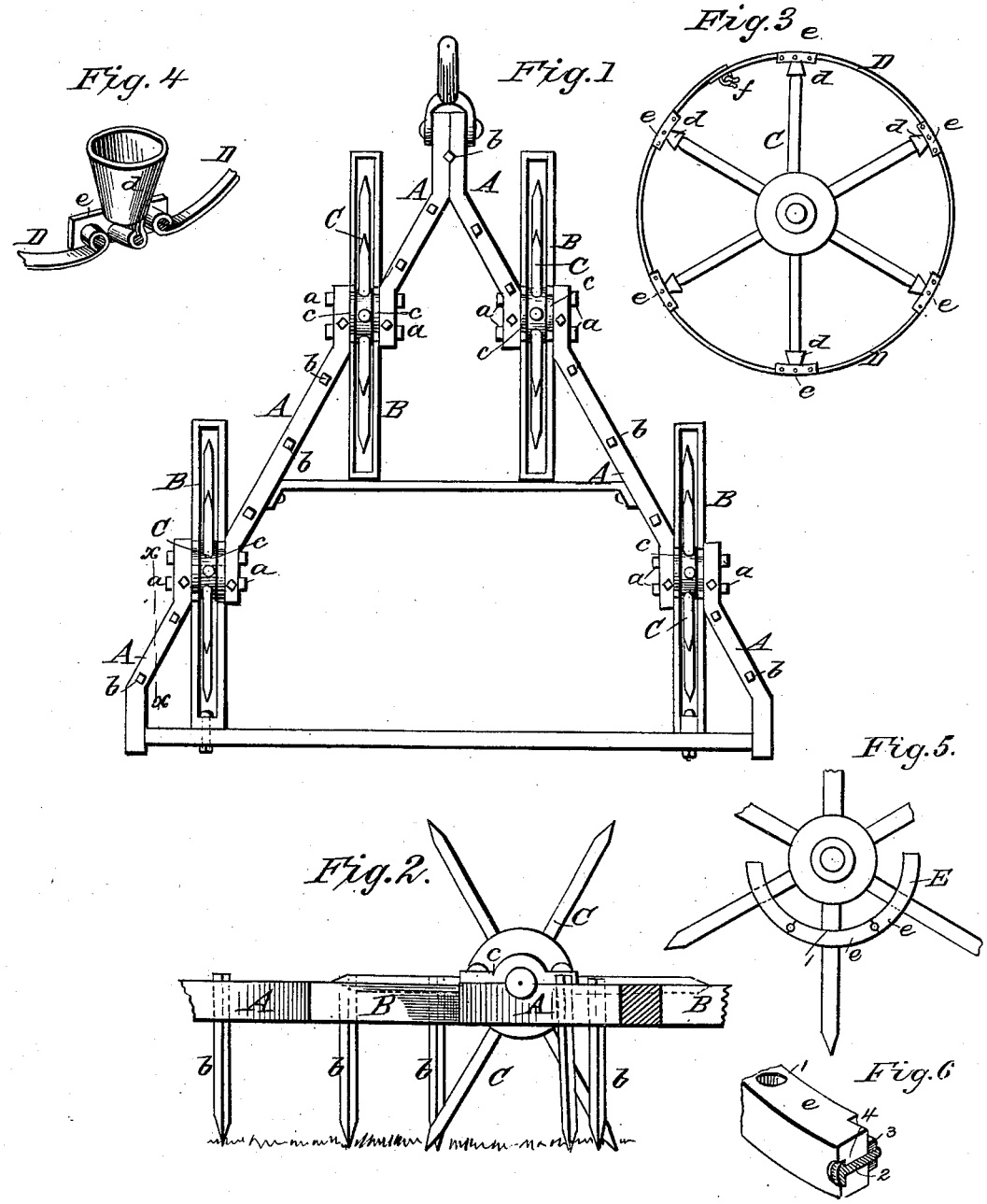
WITNESSES:
Fred G. Dieterich
Solon C. Kemon
INVENTOR:
S. Rothchild
BY Munn & Co
ATTORNEYS.

UNITED STATES PATENT OFFICE.

SAMUEL ROTHCHILD, OF PENDLETON, OREGON.

HARROW AND PULVERIZER.

SPECIFICATION forming part of Letters Patent No. 362,464, dated May 3, 1887.

Application filed December 1, 1886. Serial No. 220,403. (No model.)

*To all whom it may concern:*

Be it known that I, SAMUEL ROTHCHILD, of Pendleton, in the county of Umatilla and State of Oregon, have invented a new and useful Improvement in Harrows and Pulverizers, of which the following is a specification.

My invention is an improvement in that class of harrows and pulverizers which have both stationary and revolving teeth—that is to say, which have vertical stationary teeth and a revolving wheel that is arranged between them and provided with points or teeth adapted to pierce clods and pieces of sod.

My invention consists in the construction and arrangement of the toothed wheel relative to the stationary teeth and diagonal frame in which the latter are set, and in the construction of a flexible hood or protector for the toothed wheel, whereby the harrow is adapted to be drawn over the ground without scratching the surface, all as hereinafter described.

In the accompanying drawings, Figure 1 is a plan view of the harrow complete. Fig. 2 is a vertical section on line $x\,x$, Fig. 1. Fig. 3 is a side view of one of the toothed wheels provided with the protection or detachable tire. Fig. 4 is a perspective view of a portion of the said tire, and Figs. 5 and 6 are detail views illustrating the stop-flange for limiting the depth to which the revolving teeth will enter the ground.

The harrow-frame proper is triangular in form. The sides are made in pieces or sections A, whose ends are bent at an obtuse angle in opposite directions to adapt them for attachment by means of screw-bolts $a$ to the sides of the frames B, to which the toothed wheels C are attached and in which they revolve. The wheel-frames B are set parallel to the axis of the triangular frame A and placed at suitable distances apart. Thus the diagonal toothed bars A and wheel-frames B constitute a compound rigid frame whose parts are arranged at an angle to each other. The bars A are provided with vertical teeth $b$, in the usual way.

The teeth of wheels C are made longer than the stationary teeth $b$, and the bearings $c$ of said wheels are placed on the upper side of the frames B, for reasons that will be apparent from the following statement of the practical operation of the harrow: As the latter advances, the greater length of the teeth of wheel C enables them to pierce clods or pieces of sod in advance of the same coming in contact with the two vertical teeth $b$, which are located on either side of such wheel. The radius of the wheels C being greater than the length of teeth $b$, the wheels revolve slowly, so that the clods and sods thus pierced are held practically nearly stationary while the contiguous teeth $b$ advance. Thus the latter come in contact with the clods and sods on each side, and rub, tear, and pulverize or disintegrate the same as the revolving teeth pass slowly backward between them. This operation will be more readily understood by inspection of Fig. 2.

Besides the reason above indicated for placing the bearings $c$ of wheels C above the frame B, it is apparent that the draft of the harrow is thereby made lighter than it would be if the wheels were smaller.

It is necessary to provide means for preventing the harrow from operating on the surface of the ground when being drawn to and from the field that is to be cultivated. For this purpose I employ a protector, D, for the teeth of wheels C, the same consisting of a flexible detachable tire, Fig. 3, having a series of funnel-shaped pockets or hoods, $d$, attached to its inner side, one for each tooth of a wheel. The body of said protector or detachable tire D is formed of any suitable material, such as thick sheet metal. The hoods $d$ are jointed to sections $e$, and the sections of the tire are in turn jointed to the latter. The lapped ends of the tire, Fig. 3, are provided with a device, $f$, for locking them together detachably. When this protector is applied to the wheels C, they will obviously serve as ordinary supporting and transporting wheels.

In Figs. 5 and 6 I have illustrated the limiting-flange E, which is a ring formed in sections $e$, a section being provided for each arm C. These sections are perforated at 1 between their ends for the passage of the arms C, and have their ends united, it may be, by bolts 2 and nuts 3, as shown. In so securing the sections together it is preferred to form the meeting ends of the adjacent sections with coincident notches 4, which together receive the bolt, and to countersink the head of the bolt and the nut, as shown in Fig. 6.

I am aware that a toothed roller has been arranged in the space inclosed by a triangular toothed harrow-frame, and I do not therefore claim, broadly, the combination of a series of revolving toothed wheels arranged with their axis at an angle to the sides of a triangular harrow-frame.

What I claim is—

1. The combination, with the diagonal toothed side bars, A, of the revolving wheels C, having teeth whose length exceeds that of the teeth of said bars, and arranged and secured at the angle specified between the separable parts or sections of said bars, as shown and described.

2. The improved harrow and pulverizer, consisting of the diagonal sectional frame A, having vertical stationary teeth, the series of frames B, and revolving wheels C, arranged at an angle of forty-five degrees to said diagonal frame, and having teeth whose length exceeds that of said vertical teeth, as shown and described.

3. The improved protector D for the toothed wheels, the same consisting of a flexible band and a series of hoods attached to its inner side, as shown and described.

SAMUEL ROTHCHILD.

Witnesses:
J. F. CONNELLY,
M. L. WESTON.